United States Patent [19]

Wood et al.

[11] Patent Number: 4,772,511
[45] Date of Patent: Sep. 20, 1988

[54] TRANSPARENT NON-VITREOUS ZIRCONIA MICROSPHERES

[75] Inventors: Thomas E. Wood; Roger W. Lange, both of St. Paul, Minn.

[73] Assignee: Minnesota Mining and Manufacturing Company, St. Paul, Minn.

[21] Appl. No.: 800,688

[22] Filed: Nov. 22, 1985

[51] Int. Cl.$^4$ .............................................. B32B 5/16
[52] U.S. Cl. ...................... 428/325; 404/93; 404/94; 428/323; 428/325; 428/329; 428/330; 428/331; 428/402; 428/913; 501/34; 501/103; 501/105; 501/106; 501/107; 501/108; 501/119; 501/901
[58] Field of Search ................ 428/323, 328–331, 428/402, 913, 325; 501/34, 106–108, 119, 901, 103, 105; 404/93, 94

[56] References Cited

U.S. PATENT DOCUMENTS

| | | | |
|---|---|---|---|
| 2,326,634 | 8/1943 | Gebhard et al. | 88/82 |
| 2,354,018 | 7/1944 | Heltzer et al. | 88/82 |
| 2,407,680 | 9/1946 | Palmquist et al. | 88/82 |
| 2,963,378 | 12/1980 | Palmquist et al. | 106/193 |
| 3,313,602 | 4/1967 | Smith et al. | 23/345 |
| 3,700,305 | 10/1972 | Bingham | 350/105 |
| 3,709,706 | 1/1973 | Sowman | 106/57 |
| 3,714,071 | 1/1973 | Michalko | 252/448 |
| 3,748,274 | 7/1973 | Rankin et al. | 252/301.1 |
| 3,795,524 | 3/1974 | Sowman | 106/65 |
| 3,941,719 | 3/1976 | Yoldas | 252/463 |
| 4,025,159 | 5/1977 | McGrath | 350/105 |
| 4,117,192 | 9/1978 | Jorgensen | 428/337 |
| 4,166,147 | 8/1979 | Lange et al. | 428/328 |
| 4,248,932 | 2/1981 | Tung et al. | 428/325 |
| 4,314,827 | 2/1982 | Leitheiser et al. | 51/298 |
| 4,349,456 | 9/1982 | Sowman | 252/317 |
| 4,367,919 | 1/1983 | Tung et al. | 350/105 |
| 4,564,556 | 1/1986 | Lange | 428/325 |
| 4,605,594 | 8/1986 | Owens et al. | 428/392 |

OTHER PUBLICATIONS

Sheppard, L. M., "Better Ceramics Through Chemistry", *Mechanical Engineering*, Jun., 1984, pp. 45–52.
Haas, P. A., "Sol-Gel and Gel-Sphere Technology", *Oakridge National Laboratory Review*, pp. 45–52 (1984).
Matijevik, E., *Surface and Colloid Science*, vol. 6, 1973.
Haas, P. A. et al., "Chemical Flow Sheet Conditions for Preparing Urania Spheres by Internal Gelation", Ind. Eng. Chem. Prod. Res. Dev., vol. 19, (1980) pp. 459–467.
Haas, P. A. et al., "Preparation of Reactor Fuels by Sol Gel Processes", *Chemical Engineering Progress Symposium Series*, vol. 63, pp. 16–27 (1967).
Haas, P. A., "Preparation of Urania and Urania-Zirconia Microspheres by a Sol-Gel Process", *The Canadian Journal of Chemical Engineering*, pp. 348–353 (Dec., 1966).
Haas, P. A. and Clinton, S. D., "Preparation of Thoria and Mixed-Oxide Microspheres", *I&EC Product Research and Development*, pp. 236–244 (Sep., 1966).

*Primary Examiner*—John E. Kittle
*Assistant Examiner*—P. R. Schwartz
*Attorney, Agent, or Firm*—Donald M. Sell; Douglas B. Little

[57] ABSTRACT

Solid, transparent, non-vitreous, zirconia and zirconia-silica ceramic microspheres, useful as lens elements in retroreflective pavement markings. The microspheres are characterized by:
 (a) containing at least one additive metal oxide selected from alumina, magnesia, yttria and mixtures thereof;
 (b) an index of refraction greater than 1.6; and
 (c) being virtually free of cracks.

These microspheres are formed by a sol-gel technique of extractive gelation (extracting carboxylic acid away from zirconyl carboxylate) of a sol in liquid medium such as hot peanut oil. The microspheres of this ceramic composition have been made with relatively large diameters, (e.g. 200–1000 micrometers) making them quite useful as lens elements in pavement marking sheet materials.

32 Claims, No Drawings

TRANSPARENT NON-VITREOUS ZIRCONIA MICROSPHERES

TECHNICAL FIELD

This invention relates to ceramic articles such as microspheres made of such materials as zirconia-alumina-silica mixtures. It also relates to the field of pavement markings that include transparent microspheres for reflectorizing the markings. In another aspect it relates to a process for preparing such ceramic articles.

BACKGROUND

The pavement marking industry has long desired transparent, solid microspheres or beads that would be useful as brighter and more durable retroreflective lens elements in pavement markings. The transparent microspheres now most widely used for pavement markings are made of certain glasses, which are amorphous vitreous materials. Generally these glasses are of the soda-lime-silicate type having a refractive index of only about 1.5, which limits their retroreflective brightness. Glass microspheres of improved durability and a higher refractive index have been taught in U.S. Pat. No. 4,367,919.

A transparent ceramic microsphere made by a sol-gel process from silica and zirconium compounds is taught in U.S. Pat. No. 3,709,706. Generally, a sol-gel process is one which converts a colloidal dispersion, sol, aquasol or hydrosol of a metal oxide (or precursor thereof) to a gel. A gel is a material form wherein one or more of the components are crosslinked either chemically or physically to such an extent as to cause a three dimensional network to form. The formation of this network results in an increase in viscosity of the mixture and a mechanical immobilization of the liquid phase within the network. The gelling step is often followed by drying and then firing to obtain a ceramic material.

Microspheres used in pavement markings generally average between about 100 and 1000 micrometers in diameter in order to assure that the light-gathering portion of the microspheres protruding from the pavement marking is not obscured by road dirt.

The transparent microspheres used in retroreflective sheeting applications such as pavement marking sheets typically have an index of refraction between about 1.5 and 2.5. A refractive index ($N_D$) of at least 1.7 provides good reflectivity under dry conditions ($N_D$ of 1.9 being preferred), and some or all of the microspheres should have an index of refraction of at least 2.2 if wet reflection is desired.

In zirconia-silica ($ZrO_2$-$SiO_2$) ceramic microspheres, which are known to the art, zirconia is believed to be the constituent which imparts toughness, durability, strength and high refractive index. However, increasing the mole ratio of $ZrO_2$ to $SiO_2$ much above 1.3:1 can cause increased cracking of the microspheres during processing.

DISCLOSURE OF INVENTION

Among the objects of this invention are: (1) ceramic microspheres which are not only transparent, but which also can be made large (over 100 micrometers), have a refractive index greater than 1.6 and are highly resistant to scratching, chipping, and cracking; and (2) a reliable process for producing them without cracks or occlusions.

The present invention provides new transparent, solid ceramic particles (beads or microspheres) which can be made with sufficient clarity, index of refraction, and other properties to make them useful as superior lens elements in retroreflective pavement markings. The new ceramic particle may be summarized as:

a solid, transparent, non-vitreous, dense, ceramic spheroid substantially free of cracks, having an index of refraction greater than 1.6, and comprising zirconia and at least one other metal oxide selected from the group consisting of alumina ($Al_2O_3$), magnesia (MgO), yttria ($Y_2O_3$) and mixtures thereof wherein for those spheroids containing silica, the molar ratio of zirconia to silica is greater than 1.8, preferably greater than 2.0, more preferably greater than 2.2.

Another aspect of the invention comprises solid, transparent, non-vitreous, ceramic spheroids similar to those just described, except that they can contain silica in any ratio to zirconia provided that the weight of the other metal oxides combined is greater than 30 percent of the combined weight of zirconia and silica in the spheroids.

Normally, the molar ratio of zirconia to the sum of the moles of the other metal oxide constituents is in the range of about 1.0:0.005 to 1.0:5.0.

By using these other metal oxides or additives to zirconia, large (greater than 125 micrometer in diameter) intact, transparent, ceramic spheroids or microspheres of zirconia-magnesia, zirconia-alumina-magnesia, zirconia-alumina-silica, zirconia-silica-magnesia, zirconia-alumina-silica-yttria, zirconia-alumina-magnesia-silica, zirconia-silica-yttria, and zirconia-yttria have been prepared. In most cases, zirconia has been the predominant (by volume) phase. The use of the additive metal oxides in zirconia-silica ceramic microspheres has allowed the lowering of silica content to raise refractive index (e.g. to greater than 1.83), without producing the cracking or loss of clarity after firing which otherwise can occur in these large sizes. In the case of these large (>125 micrometer) microspheres, there is no restriction on silica content of the spheroids as is expressed in (ii) above.

Other ingredients which may be present in the inventive compositions are: (1) fluxing agents such as $B_2O_3$, $Na_2O$, $K_2O$, and $P_2O_5$; and (2) other oxides in colloidal or salt form, such as $Cr_2O_3$, CaO, NiO, $TiO_2$, $SnO_2$ and $Fe_2O_3$.

As used in this description, the term 37 solid" means a particle or body which is not hollow, i.e. lacking any substantial cavities within the microspheres such as described in U.S. Pat. No. 4,349,456 on ceramic metal oxide microcapsules.

The term "non-vitreous", for purposes of this description, means that the ceramic has not been derived from a melt or mixture of raw materials brought to the liquid state at high temperature. This term is used for the purpose of distinguishing the inventive ceramic microspheres over glass beads which are made by a melt process.

The term "transparent", for purposes of this discussion, means that the ceramic spheroids, when viewed under an optical microscope (e.g., at 100X), have the property of transmitting rays of visible light so that bodies beneath the microspheres, such as bodies of the same nature as the microspheres, can be clearly seen through the microspheres, when both are immersed in oil of approximately the same refractive index as the microspheres. Although the oil should have a refractive index approximating that of the microspheres, it should not be so close that the microspheres seem to disappear (as they would in the case of a perfect index match). The outline, periphery or edges of bodies beneath the microspheres are clearly discernible with such optical microscope.

The inventive microspheres can be made fully dense. The term "fully dense" means close to theoretical density and having substantially no open porosity detectable by standard analytical techniques such as the B.E.T. nitrogen technique (based upon adsorption of $N_2$ molecules from a gas with which a specimen is contacted). Such measurements yield data on the surface area per unit weight of a sample (e.g. $m^2/g$) which can be compared to the surface area per unit weight for a mass of perfect microspheres of the same size to detect open porosity. Higher specific surface ($m^2/g$) indicates higher surface irregularities and/or porosity. Such measurements may be made on a Quantasorb apparatus made by Quantachrome Corporation of Syossett, N.Y. Density measurements may be made using an air or water pycnometer.

The microspheres of this invention may be truly spherical but may also be oblate or prolate. The preferred ceramic microspheres are also generally characterized by: an average hardness greater than road sand; toughness, crush resistance, sphericity and retroreflectivity as great or greater than those of conventional glass beads having a similar size and a refractive index of about 1.5; and an index of refraction of between about 1.8 and 2.2. Crush resistance and brightness higher than those of known ceramic microspheres (e.g., $ZrO_2$-$SiO_2$) and average hardness greater than known transparent, sol gel ceramic microspheres have been obtained. The inventive microspheres also have fewer internal imperfections and inclusions than conventional glass beads of a similar size.

The present invention also provides a sol-gel process for making the inventive ceramic microspheres. One improved sol-gel process is a thermal extractive gelling process (as distinguished from a dehydrative gelation process) in which gelation of a sol is induced by extraction of a carboxylic acid (e.g. acetic acid) from zirconyl carboxylate. The zirconyl carboxylate is a precursor of the zirconia component of the ceramic particles of this invention when they are prepared using thermal extractive gelation. The extractant is a liquid medium such as an oil. A droplet of concentrated zirconyl acetate sol mixture experiences rapid gelling through loss of the acid, and gelled beads are produced from the sol in a matter of minutes. When the additive metal oxides are admixed in the form of soluble salts, or in some cases in the form of colloidal dispersions, in the bead precursor solution or sol, they act to prevent cracking during the drying and firing of the gelled microspheres. The "green beads" of the new compositions are removed from the extractant by standard techniques, dried, and fired (e.g. at 900° to 1350° C.).

This process provides uncracked, fired, ceramic particles in large size (greater than 125 micrometers in diameter) with a combination of retroreflective brightness and durability not available from known glass microspheres. The sol-gel process also has the advantage of lower processing temperature than glass forming processes and thus less energy consumption per unit weight produced.

When the additive metal oxide is alumina, it has been observed that gelation by the thermal extractive process occurs more readily than for zirconyl carboxylate systems not containing $Al_2O_3$ or its precursors.

The ceramic microspheres of this invention are useful not only in pavement marking materials but also in other fields such as: peening materials (because of their toughness); high temperature ball bearings; fillers and reinforcing agents in such materials as glass, refractory materials, ceramics, metal matrix materials and polymers; reflective sheeting; and media for attrition mills such as sand mills. The inventive ceramic microspheres can be crushed or otherwise pulverized and the particulate product used as an abrasive. After being thus reduced in size, the particles are no longer spherical but would have irregular shapes.

DETAILED DESCRIPTION

Whereas prior-art glass microspheres used as retroreflective elements have a generally uniform, continuous, glassy structure, substantially free of crystallinity (often specified to have less than 5 percent crystallinity), microspheres of this invention preferably have a subdivided or grainy structural nature, comprising a multiplicity of grains such as amorphous remnants of colloidal silica particles from a sol used in preparing the microspheres of the invention, or crystallites.

The term "grain" will be used hereinafter as a term generic to crystallites in crystalline materials and to domains or colloidal particles in amorphous materials. For best reflective brightness, it is preferred that the size of grains in the microspheres be no larger than 1000 angstroms (crystallites preferably 50–400 angstroms, more preferably below 150 angstroms) to minimize the effect of grain boundaries on light transmittance and also to minimize the effect of larger areas on light scattering especially with large differences in refractive index between different phases (e.g. crystalline $ZrO_2$ and $Al_2O_3$ and amorphous $SiO_2$) In order to minimize light scattering, the largest dimension of the crystallites of a light transmissive material preferably is less than one quarter of the wavelength of the transmitted light. 1000 Angstroms is well below one quarter of the average wavelength of visible light which is about 5500 angstroms. The preferred inventive microspheres appear to have characteristic crystallite sizes which are about 100 to 150 angstroms, and the crystallite size distribution appears more uniform than that of other transparent sol-gel microspheres (e.g. $ZrO_2$-$SiO_2$)

Voids in microspheres of the invention are desirably avoided, by firing the gelled microsphere precursors to a dense state, thereby improving transparency, avoiding the weakening effect that structural gaps can cause, and avoiding absorption of moisture or other liquids that can degrade the microspheres, e.g., through freeze-thaw cycles.

The inventive ceramic particles which are made with a sol containing silica have an amorphous silica phase. Most metal oxides form a polycrystalline or microcrystalline phase, and the $ZrO_2$ and $Al_2O_3$ will form different crystalline phases. Additives such as $Y_2O_3$, MgO, and CaO can form solid solutions with the zirconia, resulting in the stabilization or partial stabilization of zirconia in the cubic or tetragonal form.

A study of the effect of silica on zirconia-silica microspheres has indicated that transparency is increased with decreasing silica colloid particle size. The size of the colloidal silica particles in the starting material can vary, for example from 10 to 1000 angstroms in largest dimension. A silica colloid particle size of less than about 200 angstroms (0.020 micrometers) is believed to yield zirconia-silica ceramic microspheres having better transparency. The molar ratio of zirconia to silica is usually in the range of 10:1 to 1:2.

From x-ray analyses of zirconia-alumina-silica microspheres of the invention, it appears that the zirconia initially crystallizes in a predominantly pseudo-cubic form, generally observed after firing in air to 700°–900° C. As firing temperature is increased, the zirconia converts to the tetragonal crystalline habit. The temperature at which this occurs depends on composition. Zirconia-alumina-silica microsphere samples of mole ratio 3.00:0.81:1.00 prepared by thermal extractive gelation have been observed by X-ray analysis to show only tetragonal zirconia after firing at 1100° C. for 15 minutes. Generally, firing the microspheres to 1050°–1100° C. has resulted in maximum hardness while retaining high transparency. While firing to higher temperatures often results in higher hardness, the transparency and hence the retroreflectivity of the inventive microspheres begins to be reduced. Raising the firing temperature above 1100° C. can be accompanied by growth of the zirconia crystallites. The increased size of the zirconia crystallites can result in an increased amount of monoclinic zirconia in the cooled microspheres.

The presence of yttria in the zirconia-alumina-silica system can result in the formation of stabilized zirconia after firing. For example, microspheres having a mole ratio zirconia:alumina:silica:yttria of 1.87:0.81:1.00:0.15 exhibit an X-ray pattern consistent with the presence of yttria-stabilized, cubic zirconia ($Y_{0.15}Zr_{0.850}O_{1.93}$) after firing to only 1000° C. The zirconia component remained in the stabilized cubic form when heated to 1300° C.

In samples of the compositional family zirconia-alumina-magnesia, the presence of both tetragonal zirconia and magnesia-alumina spinel have been detected by X-ray analysis.

Silica-containing microspheres of this invention can be formed from a two phase system comprising an aqueous colloidal dispersion of silica (i.e., a sol or aquasol) and an oxygen containing zirconium compound which can be calcined to $ZrO_2$. The colloidal silica is typically in the concentration of about 1 to 50 weight percent in the silica sol. A number of colloidal silica sols which can be used in this invention are available commercially having different colloid sizes, see *Surface & Colloid Science*, Vol. 6, ed. Matijevic, E., Wiley Interscience, 1973. Preferred silicas for use in this invention are those which are supplied as a dispersion of amorphous silica in an aqueous medium (such as the Nalcoag ® colloidal silicas made by Nalco Chemical Company) and those which are low in soda concentration and can be acidified by admixture with a suitable acid (e.g. Ludox ® LS colloidal silica made by E. I. DuPont de Nemours & Co. or Nalco ® 2326 from Nalco Chemical Co.).

The zirconium compounds useful in making zirconia-containing sol gel ceramic microspheres of this invention can be organic or inorganic acid or water soluble salts, such as the zirconium salts of aliphatic mono or dicarboxylic acids (e.g. formic, acetic, oxalic, citric, tartaric, and lactic acids). Zirconyl acetate compounds are particularly useful. Colloidal zirconia sols which can be used in this invention are commercially available, for example nitrate-stabilized zirconia (0.83 moles nitrate per mole of zirconia marketed by Nyacol, Inc. of Ashland, Mass.). Useful inorganic zirconium compounds which can be used are zirconium oxynitrate and zirconium oxychloride. See U.S. Pat. No. 3,709,706, Column 4, line 61–Column 5, line 5 for further details on zirconia sources which can be used in this invention.

In the thermal extractive gelation process, to gel microspheres, a zirconyl carboxylate compound should be present. It can be used in admixture with other zirconia sources, and can be used without the other oxides (e.g. $Al_2O_3$ or $SiO_2$) to make zirconia sol-gel product. Although most of the description that follows deals with zirconyl carboxylate mixed with other oxide precursors, the process steps are applicable to the gelation of zirconyl carboxylate sols generally.

The other metal oxides mentioned earlier (e.g. $Al_2O_3$, $Y_2O_3$ or MgO) can be supplied as precursors such as water soluble salts—nitrates, halides, oxyhalides, phosphates, borates, carbonates, or salts of organic acids (mono- or di-carboxylic acids, oxoacids, hydroxy acids, amino acids, or mixtures thereof) or, as in the case of $Al_2O_3$ and $Y_2O_3$, as colloidal dispersions.

In the case of zirconia-silica based microspheres of this invention, the two major raw materials are usually present in the starting sol in amounts sufficient to provide equivalent $ZrO_2$: $SiO_2$ mole ratio in an aqueous dispersion in the range of about 10:1 to 1:2. As the proportion of the material having the higher index of refraction ($ZrO_2$) is increased, the refractive index of the resulting microspheres increases, thus allowing an adjustment of refractive index to suit different purposes.

A dispersion can be prepared by admixing a silica aquasol with an aqueous metal oxide precursor salt solution under agitation. For some starting materials, reverse order of addition (i.e. adding the metal oxide solution to the silica aquasol under agitation) can lead to non-uniform interspersal of the amorphous and crystalline grains in the final microsphere. The mixture is agitated in order to obtain a uniform dispersion without forming a floc or precipitate and may be filtered to remove extraneous material. The aqueous mixture of colloidal silica suspension and zirconium compound will generally be relatively dilute (e.g. 15 to 30 weight percent solids).

In the thermal extractive gelation process, the extracting phase or extractant is characterized by: low solubility (e.g. less than 1 weight percent) for the zirconium compound (e.g. zirconyl acetate) and other sol ingredients; moderate to high solubility (at least 1 weight percent) for the corresponding carboxylic acid (e.g. acetic acid) at temperatures at which the acid is liberated from a mixture containing zirconyl carboxylate (e.g., greater than 70° C.); a reasonable degree of stability within the temperature range of use; inertness to the chemical precursors of the ceramic; and a possibility of recycling. Unsaturated oils, such as vegetable oil, corn oil, safflower oil, soybean oil, sunflower oil, peanut oil and various derivatives of these oils meet these criteria, and peanut oil has proven to be a convenient extractant and gel forming medium. For the preparation of larger microspheres (greater than 100 micrometers), the temperature of the gel-forming medium is maintained below the point at which water destructively leaves the nascent microspheres, the preferred temperature being approximately 70° to 99° C. for feed mixtures containing zirconyl acetate in peanut oil. During microsphere gelation, acetic acid liberated from droplets of the feed sol is absorbed by the hot oil. A portion of the acetic acid may escape by evaporation.

The forming medium (e.g. peanut oil) can be regenerated by heating briefly above 118° C. to remove residual acetic acid.

Zirconyl acetate-silica sol precursor mixtures are generally concentrated (typically to about 20 to 50 weight percent fired solids) prior to introduction into the forming medium, in order to obtain a convenient density and viscosity for forming droplets, but concentration is not made so high as to cause premature gelation. Concentration has been done by rotoevaporation, which involves evaporating liquid from a heated, rotating vessel into a cooled receiving flask, often conducted under reduced pressure.

The precursor may be fed to the heated forming medium by a means which forms droplets in the forming medium. Such means would include adding the precursor as droplets and gelling them as such or adding it as a stream of liquid and shearing by agitation to produce droplets prior to gelation. Under the above-described conditions, a droplet of zirconyl acetate based sol rapidly gels, and a rigid microsphere can be produced in a matter of minutes, depending on microsphere size.

The thermal extractive gelation process can be controlled by varying the following parameters: (a) composition, concentration and temperature of the zirconyl carboxylate based precursor mixture; (b) the characteristics of the extracting medium such as acetic acid solubility and temperature; and (c) extraction conditions such as acetic acid concentration in the extractant. The extractive gelation may also comprise several different extraction stages operated at different temperatures, gradually increasing the temperature to which the microspheres are exposed. The mixture of microspheres and extractant would cascade or overflow from one stage to each succeeding stage. Residence time and temperature of each stage can also be controlled.

After the microspheres have been gelled and formed, they are collected (e.g. by filtration) and fired or exposed to high temperatures in an oxidizing (e.g. air) atmosphere usually at temperatures of 500° to 1350° C. It is preferred that most of the zirconia component attains high crystallinity and thus in general higher temperatures (greater than 900° C.) are preferred. Firing temperature should not be so high as to cause loss of transparency due to growth of the zirconia crystallites. The addition of other metal oxides to the zirconia may also alter the preferred firing temperature which can be determined experimentally. In general, higher firing temperatures also help to achieve microspheres which are fully dense. In the firing process, the unfired ceramic microspheres should be loosely packed in order to obtain a uniform, free flowing fired product.

The hardness of the microspheres of this invention is typically greater than 800 knoop. Knoop hardness (50 and 100 g. loads) measurement have been made of the inventive ceramic microspheres and certain controls. The representative hardness measurements given in Table 1 below and in the examples represent the average of at least 10 individual indentations and measurements on microspheres which had been mounted in epoxy resin and polished to obtain a planar surface.

TABLE 1

| Sample Number | Main Constituents Molar Ratios | Firing Temperature | Knoop Hardness Average | $N_D$ |
|---|---|---|---|---|
| | $ZrO_2:SiO_2:Al_2O_3$ | | | |
| A | 1.87:1.00:0.81 | 1010° C. | 1291 | 1.83–1.84 |
| B | 3.00:1.00:0.81 | 1100° C. | 1291 | 1.89–1.90 |
| | $ZrO_2:SiO_2:Al_2O_3:Y_2O_3$ | | | |
| C | 2.40:1.00:0.81:0.096 | 1100° C. | 1389 | 1.87–1.88 |
| D | 3.00:1.00:0.81:0.12 | 1100° C. | 1407 | 1.91–1.92 |
| | $ZrO_2:SiO_2:MgO$ | | | |
| E | 2.23:1.00:0.112 | 950° C. | 965 | ~1.90 |
| Control Samples | | | | |
| | 1.5 $N_D$ glass beads** | | 770 | |
| | 1.75 $N_D$ glass beads** | | 602 | |
| | 1.9 $N_D$ glass beads** | | 566 | |
| | road sand | | 573 | |
| | sand blast sand | | 1117 | |
| ZS1 | $ZrO_2:SiO_2$* 1:1 | 1000 | 800 | 1.75 |
| ZS2 | $ZrO_2:SiO_2$* 1.3:1.0 | 1030 | 955 | 1.83 |

*made by process similar to samples A–E
**150–210 micrometer particle size

Crush resistance of the inventive microspheres has been measured on an apparatus the major feature of which is two parallel plates made of very hard, non-deforming material (e.g., sapphire or tungsten carbide). A single microsphere of known diameter is placed on the lower plate and the upper plate lowered until the microsphere fails. Crush resistance is the force exerted on the microsphere at failure divided by the cross-sectional area of the microspheres ($\pi r^2$). Ten microspheres of a given composition are tested and the average result is reported as the crush resistance for the composition. Crush resistance of the inventive microspheres generally has been measured at greater than about 250,000 psi (1,720 megaPascals) and samples have been measured at greater than 300,000 psi (2,064 megaPascals) crush resistance. Glass beads typically have a crush resistance of about 50,000 to 75,000 psi (350–525 megaPascals).

Brightness or reflectivity is measured in units of millicandela/foot candle/square foot (mcd/fc/ft$^2$) with a photometer. Measurements are normally made with incident light at an angle of 86.5° from normal to the surface of a reflective sheet in which the microspheres have been incorporated, with a divergence angle between the light source and the photocell of 1.0°. The relative brightness of Sample A in Table 1 above was 2.00 compared to values of 1.40 and 1.85 for controls ZS1 and ZS2 respectively and 1.00 for 1.75 $N_D$ glass beads.

The invention will be further clarified by a consideration of the following examples which are intended to be purely exemplary. In the examples, the following raw materials have been used:

Ammonia-stabilized, colloidal silica, 14.5 weight percent $SiO_2$ with a primary particle size of about 50 angstroms and pH of about 9, obtained as Nalco® 2326 from Nalco Chemical Co.

Aqueous zirconyl acetate solution containing a complex of the formula $ZrO(O_2CCH_3)_2 \cdot XH_2O$ at a concentration equivalent to 25 percent $ZrO_2$ and water, obtained from Harshaw Chemical Co.

Aluminum formoacetate solid (34.44% $Al_2O_3$) obtained as Niacet ® from Union Carbide Corp.

Chloride-stabilized colloidal alumina, 10 weight percent $Al_2O_3$, with a primary particle size of about 20 angstroms and a pH of about 5.1, obtained as Nalco ® 614 from Nalco Chemical Co.

The term "fired solids" as used herein means the actual oxide equivalent, the weight percent of which is obtained by weighing a sample, drying and firing it to a high temperature (over 900° C.) to remove water and organic substances and any other volatile materials, weighing the fired sample and dividing this fired weight by initial sample weight and multiplying the quotient by 100.

EXAMPLE I 90.0 g of aqueous colloidal silica sol, while being rapidly stirred, was acidified by the addition of 0.75 ml concentrated nitric acid. The acidified colloidal silica was added to 200.0 g of rapidly stirring zirconyl acetate solution. 52.05 g of Niacet aluminum formoacetate (34.44% fired solids) were mixed in 300 ml deionized water and dissolved by heating to 80° C. This solution, when cooled, was mixed with the zirconyl acetate/silica mixture described previously. The resulting mixture was concentrated by rotoevaporation to 35% fired solids. The concentrated bead precursor solution was added dropwise to stirred, hot (88°-90° C.) peanut oil. The precursor droplets were reduced in size by the agitation of the oil and gelled.

The odor of acetic acid was detected almost immediately after the addition began. Agitation was continued in order to suspend most of the resulting gelled droplets in the oil. After about one hour, agitation was stopped and the gelled microspheres were separated by filtration. The recovered gelled microspheres were dried in an oven for 5 hours at 78° C. prior to firing. The dried microspheres were placed in a quartz dish and fired in air by raising the furnace temperature slowly to 900° C. over 10 hours, maintaining 900° for 1 hour, and cooling the microspheres with the furnace. The initial firing of all the samples was done in a box furnace with the door slightly open. Examination with a microscope revealed that most of the microspheres with diameters in the range of 200–300μm were intact and clear. Samples fired at 1100° C. for 15 minutes were shown by X-ray powder diffraction analysis to contain tetragonal zirconia. The microsphere constituents were in the molar ratio of $ZrO_2:Al_2O_3:SiO_2$ of 1.87:0.81:1.00.

EXAMPLE II

Microspheres were prepared in a similar fashion to that described in Example I with the exception that 56.68 g of zirconyl acetate solution was used and that the gelled beads were fired according to the following schedule: increase temperature to 900° C. over 10 hours, maintain 900° C. 1 hour, and cool sample in furnace. A sample of these beads was fired at 1100° C. for 15 minutes. Examination with a microscope revealed that the majority of beads having diameters in the range of 300–350 μm were intact and very clear. The hardness of the beads was found to average 1355 Knoop, and X-ray analysis showed the presence of tetragonal zirconia and a very small amount of pseudo-cubic zirconia. By comparison with high refractive index immersion oils the refractive index of these beads was found to be 1.87–1.88. The microsphere constituents were in the mole ratio of $ZrO_2:Al_2O_3:SiO_2$ of 2.40:0.81:1.00.

Compared to zirconia/silica microspheres made by the thermal extractive gelation process, the inventive zirconia/silica/alumina microspheres set or gel faster and can be made substantially harder.

EXAMPLE III 8.81 g. of magnesium acetate ($Mg(OAc)_2.4H_2O$) were added with agitation to 200 g. of zirconyl acetate solution. After the $Mg(OAc)_2.4H_2O$ dissolved, the mixture was concentrated by rotoevaporation (37° C., aspirator pressure) to 34.9 percent fired solids. This bead precursor concentrate was added drop wise to stirred hot peanut oil (83° to 85° C.). The oil was rapidly stirred to break the bead precursor solution into smaller droplets prior to gelation. The odor of acetic acid was detected soon after the addition had begun. The stirred mixture was maintained at 83° to 85° C. for 15 minutes during which time microspheres formed in the "green" or unfired state. The microspheres were separated from the hot oil by filtration, placed on a quartz dish and fired according to the following schedule: from 85° up to 600° C. over nine hours; from 600° to 800° C. over two hours; and maintained at 800° C. for 30 minutes. The microspheres were then allowed to cool down with the furnace. The microspheres were then refired at 850° C. (taking two hours to reach temperature and maintaining temperature for 30 minutes). A large fraction of the resulting microspheres 100 to 200 micrometers in diameter were slightly turbid but intact and retroreflective. The molar ratio of the microsphere constituents was about $ZrO_2:MgO$ of 1.0:0.1. In contrast to this result, a repetition of Example III without MgO produced no intact retroreflective microspheres over 50 μm in size, and many of the cracked fragments were black.

In the case of the magnesia additive, very transparent, large (greater than 300 micrometers diameter) intact and dense ceramic microspheres of zirconia-silica-magnesia have been prepared having a measured refractive index of about 1.90. However, when using magnesia in a system containing zirconia and silica, precautions are required because, if used in excessive amounts, magnesia causes the precipitation of zircon which is often accompanied by exaggerated grain growth which would cause the microspheres to become opaque. The examples which follow will indicate conditions at which transparent microspheres result.

EXAMPLE IV

While rapidly stirring, 75 g. of ammonia stabilized colloidal silica obtained as Nalco 2326 was quickly acidified by the addition of about 0.3 ml. of concentrated $HNO_3$. This acidified silica sol was slowly added to a rapidly agitated solution of 200 g. of zirconyl acetate solution. 8.81 g. of $Mg(OAc)_2.4H_2O$ was added, and the resulting mixture was stirred until all solids were dissolved. The resulting mixture was concentrated by rotoevaporation to about 36 percent fired solids, and microspheres were prepared as described in Example I using peanut oil at 85° to 88° C. The resulting microspheres were fired by raising the firing temperature gradually to 800° C. over an 11 hour period and maintaining temperature for 30 minutes after which the microspheres were allowed to cool. Samples of these microspheres and some which were later fired at 950° C. were transparent and retroreflective with many intact and having diameters in the range of 200 to 300 micrometers. The beads fired at 950° C. had a measured hardness of 846 Knoop. The microsphere constituents were in the molar ratio of $ZrO_2$:$SiO_2$:MgO of about 1.0:0.45:0.1.

EXAMPLE V

Microspheres were prepared in an identical fashion to that described in Example IV with the exceptions that 4.40 g. of $Mg(OAc)_2 \cdot 4H_2O$ were used rather than 8.81 g., and the solution was concentrated to about 39 percent fired solids before forming the microspheres. After firing at 850° C., the microspheres were very clear with many of them in excess of 300 micrometers in diameter remaining completely intact. After firing at 950° C., the microspheres were measured to have a refractive index of about 1.9 to 1.91 and a Knoop hardness of 965. X-ray analysis showed that tetragonal zirconia was the predominant phase. The approximate molar ratio of the microsphere constituents was $ZrO_2$:$SiO_2$:MgO of 1.0:0.45:0.05. Note, that if firing temperatures above 970° C. were used in this example, the microspheres would become opaque.

EXAMPLE VI 2.29 g. of $Y_2O_3$ were dissolved in 10 mls of $H_2O$ and the minimum amount of concentrated $HNO_3$ required to obtain dissolution. This solution was added to 200 g. of zirconyl acetate sol. Microspheres were prepared from this solution as described in Example III except that the firing conditions were: temperature raised to 1000° C. over seven hours, and maintained at 1000° C. for 30 minutes after which the microspheres were allowed to cool with the furnace. A large fraction of the microspheres 200 micrometers in diameter and less were intact and exceptionally clear. The molar ratio of the microsphere constituents was $ZrO_2$:$Y_2O_3$ of 1.0:0.02.

EXAMPLE VII

Microspheres were prepared in an identical fashion to that described in Example I with the exceptions that: 70.1 lg of Nalco 2326 colloidal silica which had been acidified with about 0.5 ml of concentrated nitric acid and 140.25 g of Nalco 614 colloidal alumina were used as the silica and alumina sources, and 17.06 g of 21.41% fired solids yttrium nitrate solution were added to the colloidal silica-zirconyl acetate mixture. The resulting mixture was concentrated to about 33% fired solds before forming the microspheres in the hot oil. The temperature of the forming oil was 92° C. After separating the microspheres by filtration, they were placed in a quartz tray and fired by slowly raising the temperature over 10 hours to 900° C. and maintaining 900° C. for 1 hr. The sample was allowed to cool with the furnace. After heating up to 900° C., a sample of beads was fired at 1100° C. for 15 minutes. Microscopic examination revealed that there were many intact and very clear microspheres having diameters in the range of 200 to 400 μm. The predominant crystalline phase detected by X-ray analysis was pseudo-cubic zirconia, and the hardness was measured to be 1389 Knoop. The microsphere constituents were in the mole ratio of $ZrO_2$:$Al_2O_3$:$SiO_2$:$Y_2O_3$ of 2.40:0.81:1.00:0.096.

EXAMPLE VIII

Microspheres were prepared in an identical fashion to that described in Example VII with the exception that 56.09 g of Nalco 2326 colloidal silica, which had been acidified with about 0.5 ml of concentrated nitric acid, 112.18 g Nalco 614 colloidal alumina, and 21.33 g of 21.41% fired solids yttrium nitrate solution were used. After heating up to 900° C. a sample of the beads was fired at 1100° C. for 15 minutes. Examination with a microscope revealed that a large fraction of the beads with diameters in the 150–300 μm range were intact and very clear. By comparison with high refractive index immersion oils the refractive index of these beads was measured to be 1.91–1.92. The hardness was found to be 1407 Knoop and X-ray analysis revealed the presence of pseudo-cubic and tetragonal zirconia. The microsphere constituents were in the mole ratio of $ZrO_2$:$Al_2O_3$:$SiO_2$:$Y_2O_3$ of 3.00:0.81:1.00:0.12.

It is within the scope of this invention to impart color to the transparent ceramic microspheres. The aqueous dispersions which are used to form the ceramics of this invention can contain various other water-soluble metal compounds which will impart internal color to the finished ceramic without sacrificing clarity. The adding of colorants to the inventive ceramics may be done in accordance with the teaching of U.S. Pat. No. 3,795,524 found in Col. 4, line 72-Col. 5, line 27. Colorants such as ferric nitrate (for red or orange) may be added to the dispersion in an amount of about 1 to 5 weight percent of the total metal oxide present. Color can also be imparted by the interaction of two colorless compounds under certain processing conditions (e.g., $TiO_2$ and $ZrO_2$ may interact to produce a yellow color).

Industrial Applicability

The transparent, ceramic microspheres of this invention are useful in pavement marking sheet materials (i.e. sheeting to be applied to road surfaces). The microspheres of this invention can also be incorporated into coating compositions which generally comprise a film-forming material in which a multiplicity of the microspheres are dispersed (e.g., see Palmquist U.S. Pat. No. 2,963,378). The microspheres may also be used in drop-on applications for such purposes as highway lane striping in which the beads are simply dropped onto wet paint or hot thermoplastic and adhered thereto.

There are several types of retroreflective sheeting in which the inventive microspheres may be used, such as exposed lens (as taught for example in U.S. Pat. Nos. 2,326,634 and 2,354,018), embedded lens (see for example U.S. Pat. No. 2,407,680) and encapsulated lens (see U.S. Pat. No. 4,025,159) sheeting. These sheeting types and methods for manufacturing them are known to the art. The drawings of the aforementioned patents (4,025,159; 2,407,680; and 2,326,634) illustrate the various sheeting types and are incorporated by reference herein.

One type of retroreflective sheet material useful for traffic signs comprises a polymeric binder film in which a monolayer of the inventive microspheres is embedded to about half their diameter or more. The microspheres are in optical connection with a reflecting means, such as an aluminum coating on their embedded surfaces. Such retroreflective sheet material can be made by: (i) partially embedding a monolayer of the inventive microspheres into a treated carrier web (e.g., polyethylene-coated paper); (ii) coating the microspheres with aluminum by vacuum vapor deposition; (iii) applying a binder coating (e.g., 68 weight percent solids alkyd resin solution in aromatic solvent); (iv) curing the binder (e.g., 30 minutes at 95° C.); (v) applying a clear polymeric base layer (e.g., 20 weight percent solution of polyvinyl butyral in xylene-butanol solvent) over the binder; (vi) drying the base layer (e.g. 30 minutes at 95° C.); and (vii) stripping away the carrier web.

One typical pavement marking sheet is described in U.S. Pat. No. 4,248,932 which is incorporated herein by reference. This sheet material is a prefabricated strip adapted to be laid on and secured to pavement for such purposes as lane dividing lines and comprises:

1. A base sheet, such as a soft aluminum foil which is conformable to a roadway surface;
2. A top layer (also called the support film or binder film) adhered to one surface of the base sheet and being very flexible and resistant to rupture; and
3. A monolayer of particles such as transparent microsphere lens elements partially embedded in the top layer in a scattered or randomly separated manner.

The pavement marking sheet construction may also include an adhesive (e.g., pressure sensitive, heat or solvent activated, or contact adhesive) on the bottom of the base sheet, see FIG. 1 of U.S. Pat. No. 4,248,932.

The base sheet may be made of an elastomer such as acrylonitrile-butadiene polymer, polyurethane, or neoprene rubber.

The top layer in which the transparent microspheres are embedded may typically be a polymer such as vinyl polymers, polyurethanes, epoxies, and polyesters. The microsphere lenses may alternatively be completely embedded in a layer of the pavement marking sheet. Another patent describing such pavement marking sheet material is U.S. Pat. No. 4,117,192, which is incorporated herein by reference.

Pavement marking sheets may be made by processes known in the art (see e.g. U.S. Pat. No. 4,248,932), one example comprising the steps of: (i) coating onto a base sheet of soft aluminum (50 micrometers thick) a mixture of resins (e.g., epoxy and acrylonitrile butadiene elastomer mixture), pigment ($TiO_2$) and solvent (e.g., methylethylketone) to form the support film; (ii) dropping onto the wet surface of the support film ingredients a multiplicity of the sol gel microspheres (160 micrometers and larger in diameter) of this invention; and curing the support film at 150° C. for about 10 minutes. A layer of adhesive is then usually coated on the bottom of the base sheet.

The microspheres may be treated with an agent which improves adhesion between them and the top layer, or such an agent may be included in the top layer where it contacts the microspheres. Silane coupling agents are useful for this purpose.

Pigments or other coloring agents may be included in the top layer in an amount sufficient to color the sheet material for use as a traffic control marking. Titanium dioxide will typically be used for obtaining a white color; whereas, lead chromate will typically be used to provide a yellow color.

In some useful embodiments of this invention, a specular reflective means is provided by a layer of metal (e.g. aluminum) vapor-deposited on the microspheres. Another useful specular reflective means is a dielectric reflector which comprises one or more layers of a transparent material behind the microspheres, each layer having a refractive index of about 0.3 higher or lower than that of the adjacent layer or beads and each layer having an optical thickness corresponding to an odd numbered multiple of about ¼ wavelength of light in the visible range. More detail on such dielectric reflectors is found in U.S. Pat. No. 3,700,305.

Other embodiments of this invention will be apparent to those skilled in the art from a consideration of this specification or practice of the invention disclosed herein. Various omissions, modifications, and alterations of this invention may be made without departing from the true scope and spirit of this invention which is indicated by the following claims.

What is claimed is:

1. A solid, transparent, non-vitreous, ceramic spheroid substantially free of cracks, having substantially no open porosity detectable by BET nitrogen technique and an index of refraction greater than 1.6 and comprising crystalline zirconia and at least one other metal oxide selected from the group consisting of alumina, magnesia, yttria, and mixtures thereof, and which can in addition contain silica wherein, for those spheroids containing silica, the molar ratio of zirconia to silica is greater than 1.8.

2. The solid, transparent, ceramic spheroid of claim 1 wherein the molar ratio of zirconia to the sum of the moles of the other metal oxides is within the range of about 1.0:0.005 to 1.0:5.0.

3. The solid, transparent, ceramic spheroid of claim 2 having a refractive index greater than 1.83.

4. The transparent, ceramic spheroid of claim 1 wherein the predominant crystal structure of the zirconia is selected from the following structures: tetragonal and cubic.

5. The solid, transparent, ceramic spheroid of claim 1 which further comprises an amorphous silica phase.

6. The solid, transparent, ceramic spheroid of claim 5 wherein the molar ratio of zirconia to silica is in the range of 10:1 to 1.8:1.

7. The solid, transparent, ceramic spheroid of claim 1 wherein average grain size is less than 1000 angstroms.

8. The solid, transparent, ceramic spheroid of claim 1 having a diameter greater than 125 micrometers.

9. A sheet material comprising polymeric binder film in which is embedded a multiplicity of the solid, transparent, ceramic spheroids of claim 1.

10. A pavement marking sheet material comprising:
a. a base sheet adherable to a roadway surface; and
b. the sheet material of claim 9 adhered to one surface of the base sheet.

11. A retroreflective sheet material comprising a polymeric binder film in which the spheroids of claim 1 are embedded and a reflecting means, there being a light path through the spheroids to the reflecting means.

12. A pavement marking comprising a layer of polymeric binder material supported on a roadway surface and the spheroids of claim 1 embedded therein.

13. A solid, transparent, non-vitreous, ceramic spheroid substantially free of cracks, having substantially no open porosity detectable by BET nitrogen technique and an index of refraction greater than 1.6 and comprising crystalline zirconia, silica, and at least one other metal oxide selected from the group consisting of alumina, magnesia, yttria, and mixtures thereof, wherein the weight of the other metal oxides combined is greater than 30 percent of the combined weight of zirconia and silica in the spheroid.

14. The solid, transparent, non-vitreous, ceramic spheroid of claim 13 wherein the molar ratio of zirconia to the sum of the moles of the other metal oxides is within the range of 1.0:0.005 to 1.0:5.0.

15. The solid, transparent, ceramic spheroid of claim 13 having a diameter greater than 125 micrometers.

16. A sheet material comprising polymeric binder film in which is embedded a multiplicity of the solid, transparent, ceramic spheroids of claim 13.

17. A pavement marking sheet material comprising:
a. a base sheet adherable to a roadway surface; and
b. the sheet material of claim 16 adhered to one surface of the base sheet.

18. A retroreflective sheet material comprising a polymeric binder film in which a monolayer of the spheroids of claim 13 is embedded and a reflecting means, there being a light path through the spheroids to the reflecting means.

19. A pavement marking comprising a layer of polymeric binder material supported on a roadway surface and the spheroids of claim 13 embedded therein.

20. A solid, transparent, non-vitreous, ceramic spheroid substantially free of cracks and having an index of refraction greater than 1.6, having a diameter of at least 125 micrometers and comprising crystalline zirconia and at least one other metal oxide selected from the group consisting of alumina, magnesia, yttria and mixtures thereof.

21. The solid, transparent, ceramic spheroid of claim 20 wherein the molar ratio of zirconia to the sum of the moles of the other metal oxides is within the range of 1.0:0.005 to 1.0:5.0.

22. The solid, transparent, ceramic spheroid of claim 21 having a refractive index greater than 1.83.

23. The solid, transparent, ceramic spheroid of claim 20 which further comprises an amorphous silica phase.

24. A sheet material comprising polymeric binder film in which is embedded a multiplicity of the solid, transparent, ceramic spheroids of claim 20.

25. A pavement marking sheet material comprising:
a. a base sheet adherable to a roadway surface; and
b. the sheet material of claim 24 adhered to one surface of the base sheet.

26. A retroreflective sheet material comprising a polymeric binder film in which a monolayer of the spheroids of claim 20 is embedded and a reflecting means, there being a light path through the spheroids to the reflecting means.

27. A pavement marking comprising a layer of polymeric binder material supported on a roadway surface and the spheroids of claim 20 embedded therein.

28. A pavement marking comprising a layer of polymeric binder material in which is embedded a multiplicity of solid, transparent, non-vitreous, ceramic spheroids having substantially no open porosity detectable by BET nitrogen technique and an index of refraction greater than 1.6 and comprising crystalline zirconia and at least one other metal oxide selected from the group consisting of alumina, magnesia, yttria and mixtures thereof.

29. A pavement marking comprising a layer of polymeric binder material in which is embedded a multiplicity of solid, transparent, non-vitreous, ceramic spheroids having substantially no open porosity detectable by BET nitrogen technique and an index of refraction greater than 1.6 and comprising crystalline zirconia and at least one other metal oxide selected from the group consisting of alumina, magnesia, yttria and mixtures thereof.

30. A pavement marking comprising a layer of polymeric binder material in which is embedded a multiplicity of solid, transparent, non-vitreous, ceramic spheroids having a diameter of at least 125 micrometers and an index of refraction greater than 1.6 and comprising crystalline zirconia and at least one other metal oxide selected from the group consisting of alumina, magnesia, yttria and mixtures thereof.

31. A solid, transparent, non-vitreous, ceramic spheroid substantially free of cracks and having an index of refraction greater than 1.6, having a diameter of at least 125 micrometers and comprising crystalline zirconia, alumina, and silica wherein the molar ratio of zirconia to silica is greater than 1.8.

32. A pavement marking comprising a layer of polymeric binder material in which is embedded a multiplicity of solid, transparent, non-vitreous, ceramic spheroids having substantially no open porosity detectable by BET nitrogen technique and an index of refraction greater than 1.6 and comprising crystalline zirconia, alumina and silica wherein the molar ratio of zirconia to silica is greater than 1.8.

* * * * *

UNITED STATES PATENT AND TRADEMARK OFFICE
CERTIFICATE OF CORRECTION

PATENT NO. : 4,772,511
DATED : September 20, 1988
INVENTOR(S) : Wood, et al

It is certified that error appears in the above-identified patent and that said Letters Patent is hereby corrected as shown below:

Column 2, line 50, "term 37solid" should be --term "solid"--.

Column 4, line 39, "$SiO_2$) In" should be --$SiO_2$). In--.

Column 4, line 49, "(e.g. $ZrO_2$-$SiO_2$)" should be --(e.g. $ZrO_2$-$SiO_2$).--.

Column 5, line 33, "$(Y_{0.15}Zr_{0.85}O_{1.93})$" should be $(Y_{0.15}Zr_{0.85}O_{1.93})$--.

Column 9, line 54, "56.68 g" should be --256.68 g--.

Column 11, line 46, "fired solds" should be --fired solids--.

Signed and Sealed this

Twenty-fourth Day of January, 1989

*Attest:*

DONALD J. QUIGG

*Attesting Officer*     *Commissioner of Patents and Trademarks*